United States Patent [19]

Albright et al.

[11] Patent Number: 5,492,367
[45] Date of Patent: Feb. 20, 1996

[54] METHOD AND SYSTEM FOR FOLDING AN AIR BAG

[75] Inventors: Bruce S. Albright, Beavercreek; Laura A. Hawthorn, Vandalia, both of Ohio

[73] Assignee: General Motors Corporation, Detroit, Mich.

[21] Appl. No.: 193,542

[22] Filed: Feb. 7, 1994

[51] Int. Cl.$^6$ ................................................. B60R 21/20
[52] U.S. Cl. ...................... 280/743.1; 280/728.1
[58] Field of Search ...................... 280/743 R, 728 R; 493/243, 246, 940

[56] References Cited

U.S. PATENT DOCUMENTS

| | | | |
|---|---|---|---|
| 3,625,543 | 12/1971 | Wolff | 280/150 |
| 3,736,004 | 5/1973 | Haruna | 280/150 |
| 3,799,573 | 3/1974 | McDonald | 280/150 |
| 4,004,828 | 1/1977 | Sogabe et al. | 280/743 |
| 4,235,453 | 11/1980 | Lawson et al. | 280/743 |
| 4,332,398 | 6/1982 | Smith | 280/732 |
| 4,830,401 | 5/1989 | Honda | 280/736 |
| 4,842,300 | 6/1989 | Ziomek et al. | 280/732 |
| 5,140,799 | 8/1992 | Satoh | 280/743 R X |
| 5,178,407 | 1/1993 | Kelley | 280/728 |
| 5,275,435 | 1/1994 | Fischer | 280/728 R X |
| 5,290,861 | 3/1994 | Bollaert | 280/743 R |
| 5,348,341 | 9/1994 | Webber | 280/743 R |
| 5,348,343 | 9/1994 | Hawthorn | 280/743 R X |

FOREIGN PATENT DOCUMENTS 0243444  10/1991  Japan ............................. 280/743 R

*Primary Examiner*—Margaret A. Focarino
*Assistant Examiner*—Christopher Ellis
*Attorney, Agent, or Firm*—Kathryn A. Marra

[57] ABSTRACT

A method and system for folding an air bag for a supplemental inflatable restraint system for use in a vehicle wherein the air bag includes a front face, a rear face, upper and lower edges, an inflation opening located on the front face, and an upper portion defined between the upper edge and the inflation opening and a lower portion defined between the lower edge and the inflation opening. The air bag is initially placed in a flattened position and the lower portion is provided with a series of unidirectional folds to define a rolled portion of the air bag. Subsequently, the upper portion is folded over the rolled portion. During deployment, the upper portion is initially deployed and the lower portion subsequently unrolls generally downwardly and across the lap of an occupant in the vehicle.

12 Claims, 4 Drawing Sheets

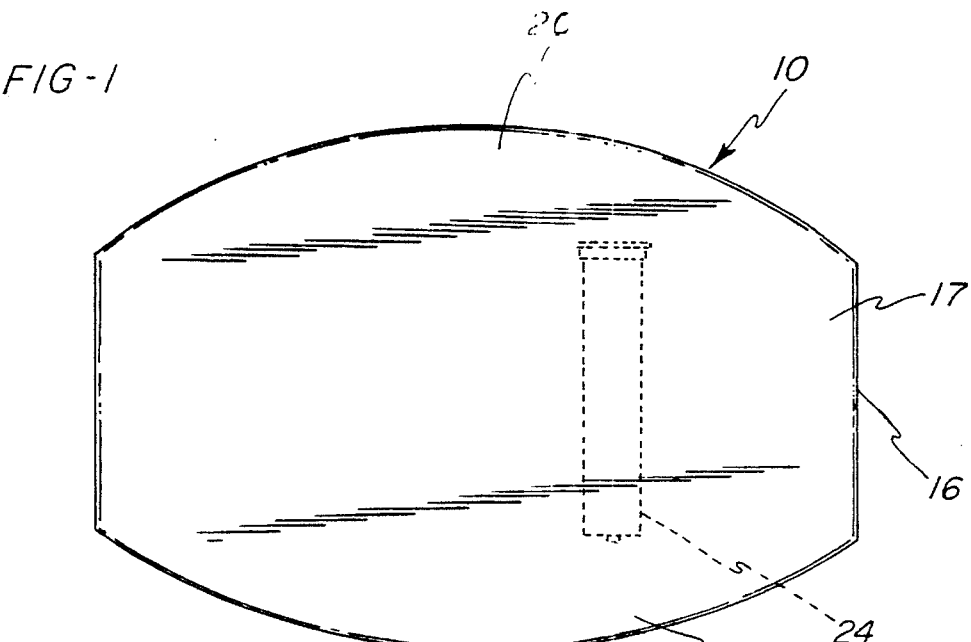
FIG-1
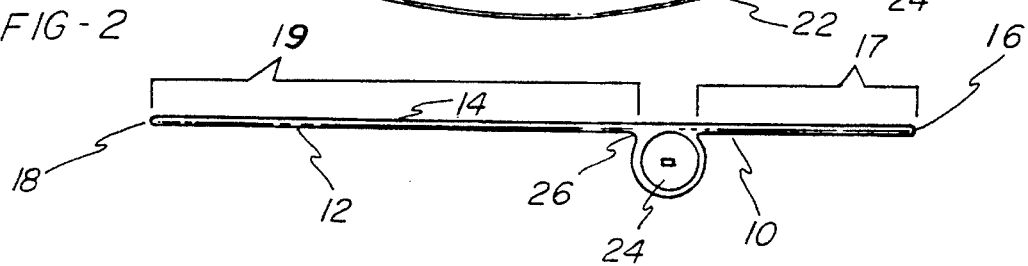
FIG-2
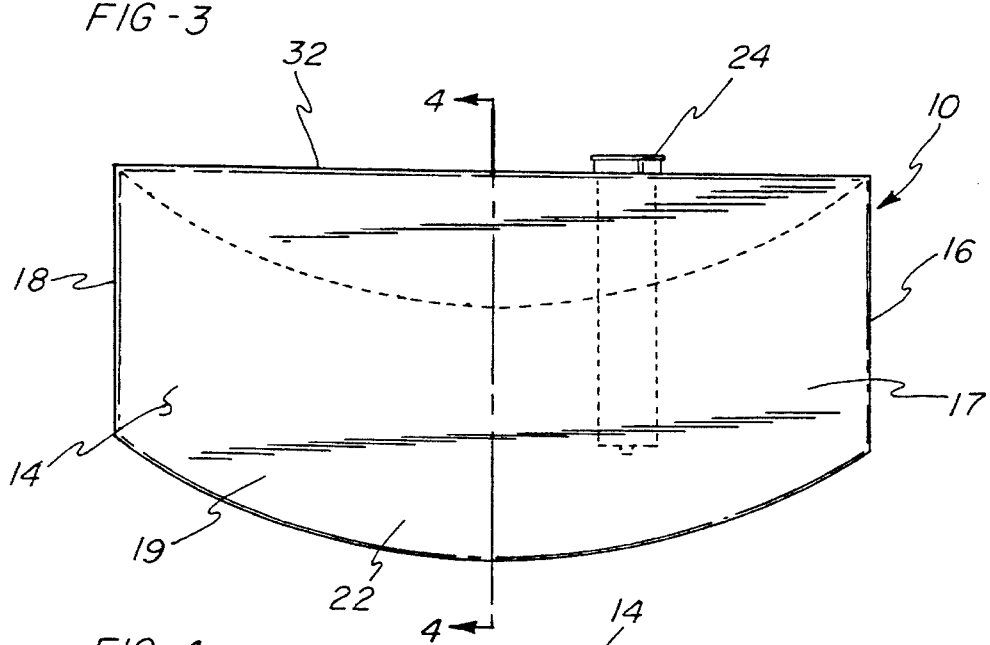
FIG-3
FIG-4
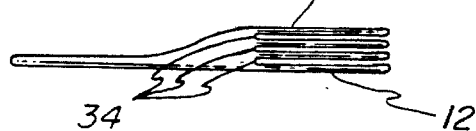

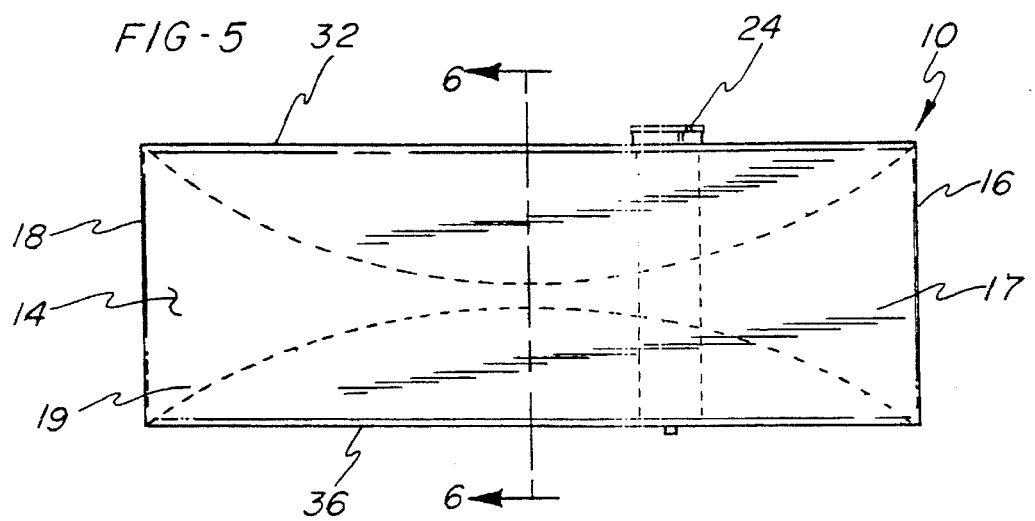
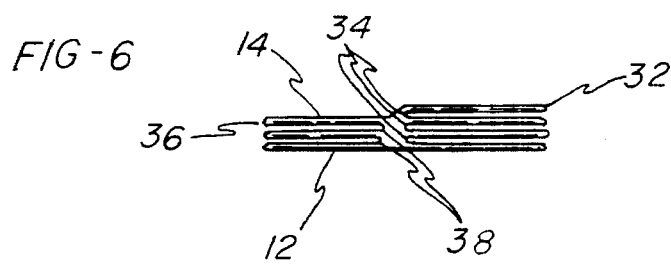
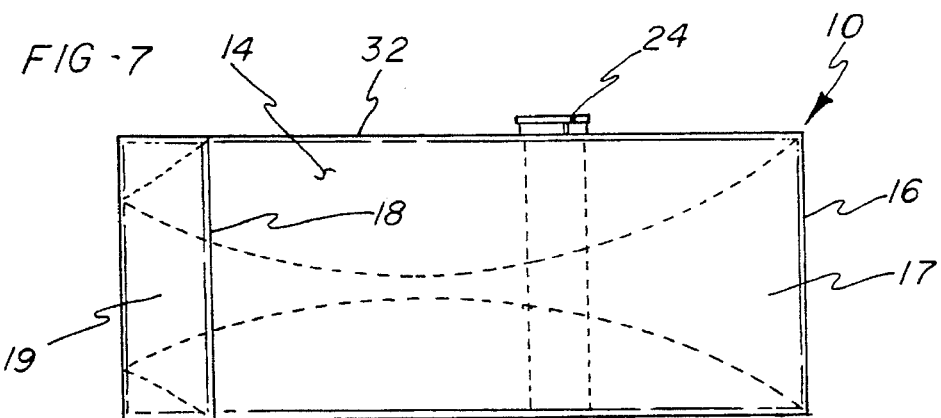
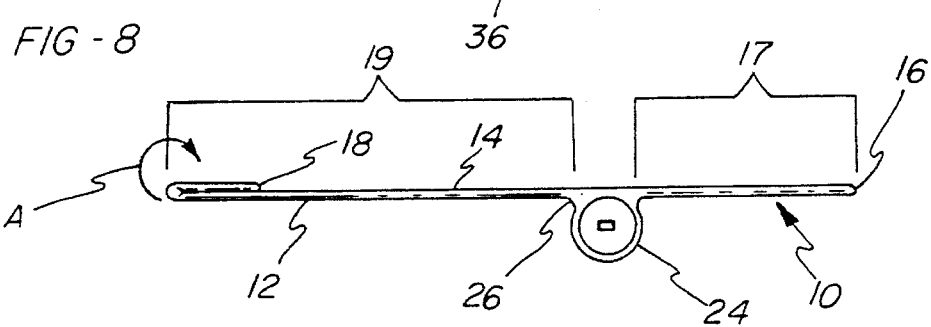

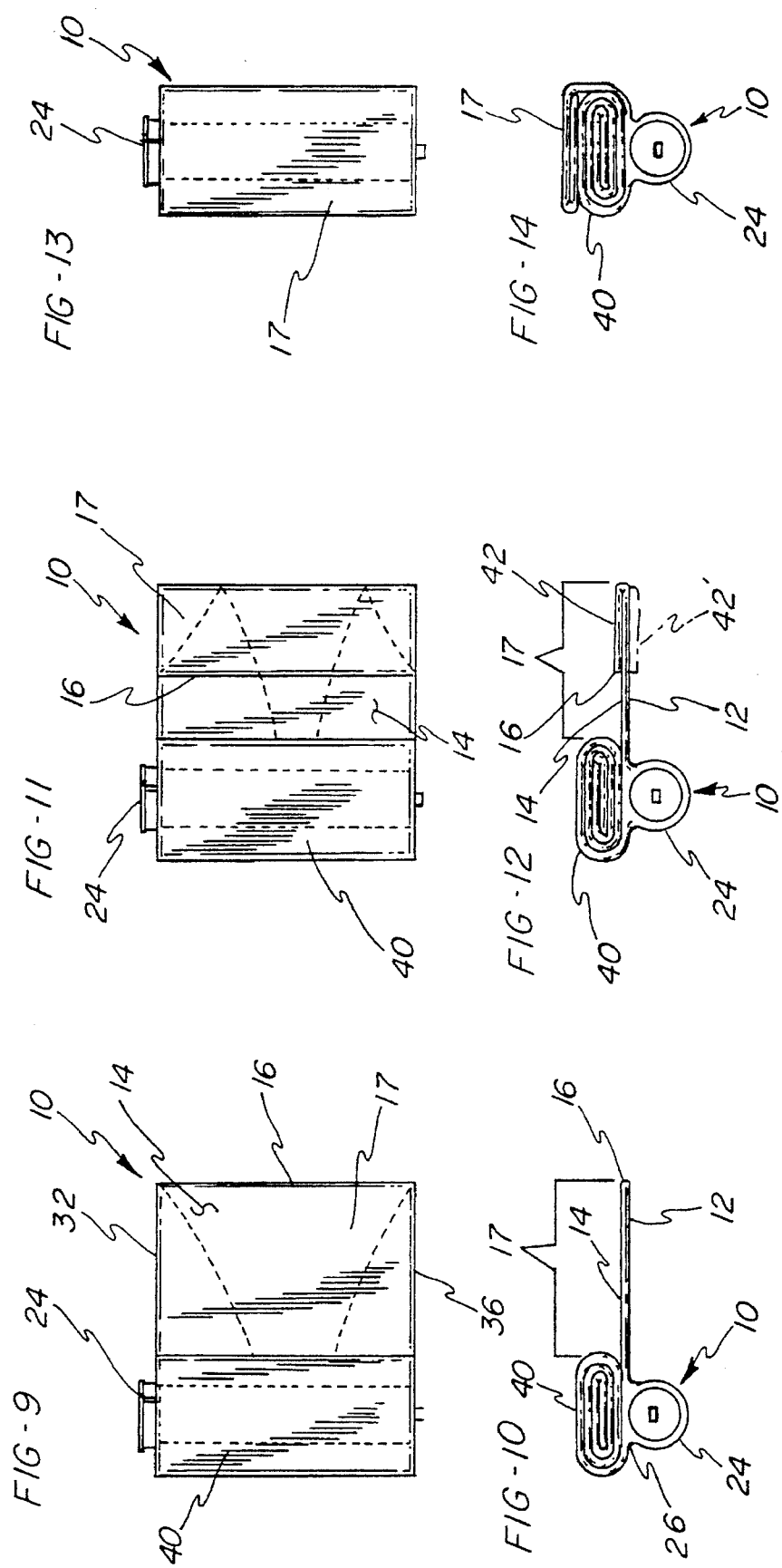

5,492,367

METHOD AND SYSTEM FOR FOLDING AN AIR BAG

BACKGROUND OF THE INVENTION

1. Field of the Invention

The present invention relates to a folded air bag for use in a supplemental inflatable restraint system of a vehicle and, more particularly, to an improved method of folding an air bag.

2. Description of the Prior Art

In known supplemental inflatable restraint systems, a module containing an air bag is mounted within a vehicle such that the air bag may be deployed in the event of an accident. For example, the module may be mounted within the instrument panel of the vehicle to restrain an occupant in the front passenger seat.

Typically, the air bag has a number of folds and, when the air bag is inflated, high pressure gas is directed into the air bag to cause the bag to unfold and inflate. In the event of an accident, the air bag will deploy to contact the vehicle occupant as the occupant moves forward. Thus, the bag will absorb energy imparted by the occupant and thereby limit forward movement of the occupant within the vehicle cabin. Various air bag fold techniques have been proposed in order to ensure that the air bag is in proper position relative to the occupant during deployment of the bag.

Typically, the air bag is provided with zig-zag or accordion folds in order to form the bag into a compact shape which will fit into the housing. Upon actuation of an inflator, the bag will unfold to its desired position in front of the occupant. The characteristics of the air bag during deployment are related to the method in which the air bag is folded for storage within the module.

SUMMARY OF THE INVENTION

It is a primary object of the present invention to provide an improved air bag folding method.

In one aspect of the invention, a method of folding an air bag for a vehicle supplemental inflatable restraint system is provided comprising the steps of providing an air bag in a flattened position, wherein the air bag in the flattened position includes upper and lower edges and an inflation opening located between the upper and lower edges. An upper air bag portion is defined between the upper edge and the inflation opening and a lower air bag portion is defined between the lower edge and the inflation opening. The method further includes the step of forming a series of unidirectional folds in the lower portion to form a rolled portion of the air bag and subsequently, folding the upper portion of the air bag over the rolled portion.

In a further aspect of the invention, the air bag includes a front face and a rear face wherein the inflation opening is formed in the front face. The step of forming a series of unidirectional folds includes successively folding the lower portion from a rear edge thereof along the rear face such that the rolled portion is located on top of the rear face opposite from the inflator opening.

In a further aspect of the invention, the air bag includes opposing lateral sides extending between the upper and lower edges wherein accordion folds are formed in the lateral sides to define a folded width of the air bag prior to the step of forming the unidirectional folds in the lower portion.

Other objects and advantages of the invention will be apparent from the following description, the accompanying drawings, and the appended claims.

BRIEF DESCRIPTION OF THE DRAWINGS

FIG. 1 is a top plan view of an air bag to be folded in accordance with the present invention;

FIG. 2 is a side elevational view of the air bag shown in FIG. 1;

FIG. 3 is a top plan view of the air bag with a first lateral side folded inwardly;

FIG. 4 is a cross-sectional view taken along line 4—4 in FIG. 3;

FIG. 5 is a top plan view with both lateral sides folded inwardly;

FIG. 6 is a cross-sectional view taken along line 6—6 in FIG. 5;

FIG. 7 is a top plan view showing the lower portion of the air bag in an initially folded position;

FIG. 8 is a side elevational view of the folded bag shown in FIG. 7;

FIG. 9 is a top plan view showing the lower portion of the air bag completely folded or rolled and located above the inflator;

FIG. 10 is a side elevational view of the folded air bag of FIG. 9;

FIG. 11 is a top plan view showing an initial fold of a top portion of the air bag;

FIG. 12 is a side elevational view of the folded air bag of FIG. 11;

FIG. 13 is a top plan view of the air bag at the completion of the folding;

FIG. 14 is a side elevational view of the top portion positioned in the lower portion of the folded air bag of FIG. 13.

DETAILED DESCRIPTION OF THE PREFERRED EMBODIMENT

Figure 15:
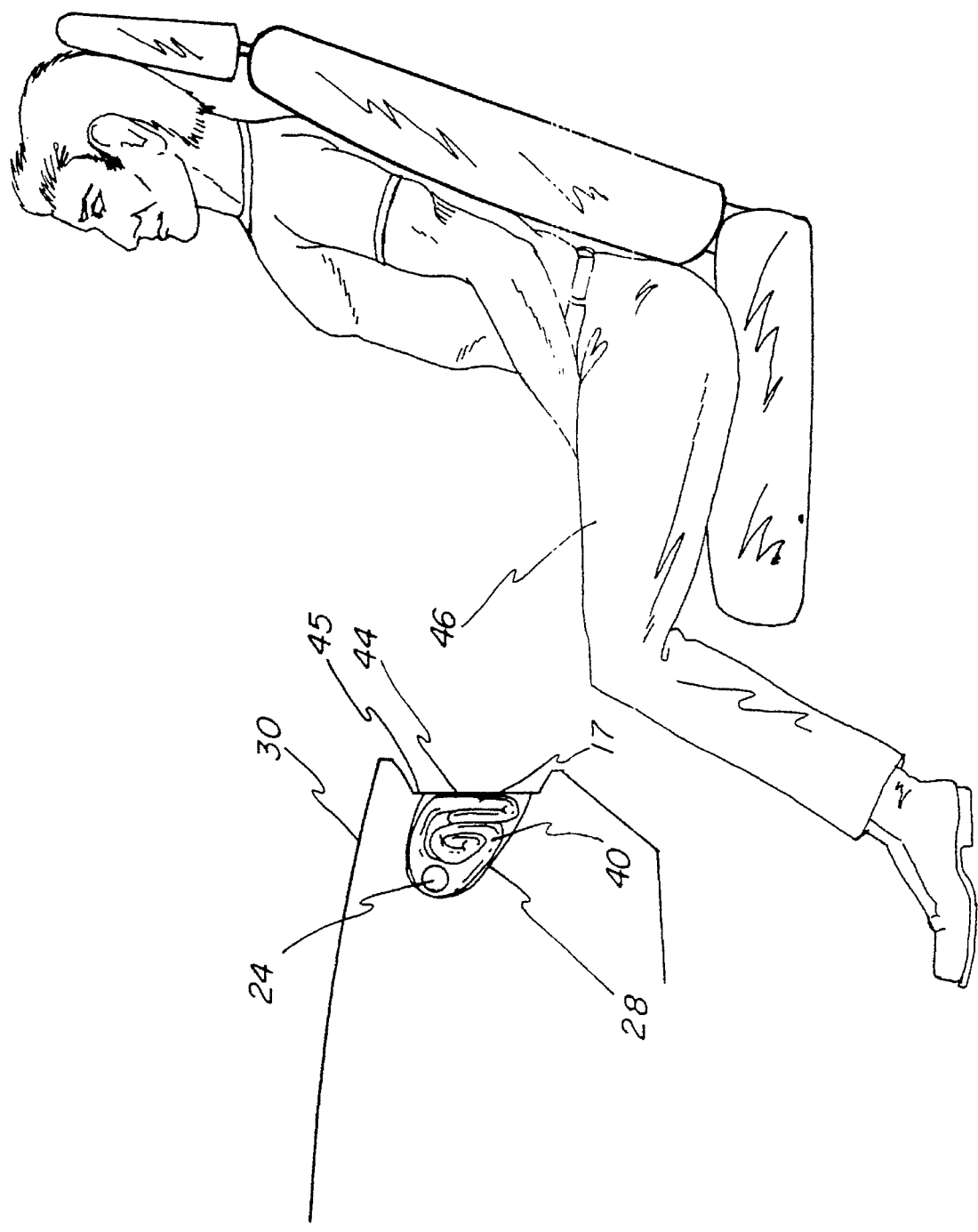
FIG. 15 is a side elevational partially cut-away view showing the folded air bag positioned within a vehicle instrument panel.

Referring initially to FIGS. 1 and 2, the present invention relates to the folding of an air bag 10. The air bag 10 includes a front face 12 and a rear face 14 and, in an initial step of the folding operation, the front and rear faces 12, 14 are placed in a flattened position in facing relationship to each other. In this position, an upper edge 16 and lower edge 18 are defined on the air bag with opposing first and second lateral sides 20 and 22, respectively, extending between the upper and lower edges 16, 18.

An inflator 24 is provided attached to the front face 12 at a connecting area 26 defining an inflation opening for the air bag 10, wherein an upper portion 17 of the air bag 10 is defined between the upper edge 16 and the inflation opening on both the front and rear faces 12 and 14, and a lower portion 19 of the air bag 10 is defined between the lower edge 18 and the inflation opening on both the front and rear faces 12 and 14. The inflator 24 is provided for directing an inflating fluid, such as nitrogen gas, into the air bag 10 through the inflation opening to thereby inflate the air bag 10 in a known manner. Further, the inflator 24 is adapted to facilitate mounting of the air bag 10 into a supplemental inflatable restraint system module 28 (FIG. 15) located within a vehicle instrument panel 30, as illustrated in FIG. 15.

Referring to FIGS. 3 and 4, with the front face 12 of the air bag facing in a first direction, the first lateral side 20 of the air bag 10 is initially tucked laterally inwardly to define a first substantially straight lateral edge 32. Preferably, the lateral side 20 is provided with a plurality of zig-zag or accordion folds, such as the three folds 34 shown in FIG. 4, located between the front and rear faces 12, 14.

Referring to FIGS. 5 and 6, the second lateral side 22 is tucked laterally inwardly to define a second substantially straight lateral edge 36. The lateral side 22 is preferably provided with two accordion folds 38 extending inwardly between the front and rear faces 12, 14. With the accordion folds 34, 38 thus formed, the final width dimension of the air bag 10 is defined by the lateral edges 32 and 36, and is substantially equal to the width of the inflator 24 in the embodiment being described.

Referring to FIGS. 7–10, the lower portion 19 is provided with a series of unidirectional folds starting from the lower edge 18 and proceeding toward the inflator 24. The folds are formed by successively folding the lower portion 19 in a second direction over the rear face 14, as is illustrated by the arrow A in FIG. 8. The lower portion 19 is folded or rolled until it defines a rolled portion 40 located over the inflation opening defined by the connecting area 26 between the air bag 10 and the inflator 24.

Referring to FIGS. 11 and 12, an end portion 42 of the upper portion 17 adjacent to the upper edge 16 is folded into overlapping relation to an adjacent area of the rear face 14 of the upper portion 17. Subsequently, the upper portion 17 is folded to position the overlapping end portion 42 over the rolled portion 40 to complete the folding of the air bag 10.

It should be noted that, as an alternative to folding the end portion 42 over the rear face 14 in the direction shown in FIG. 12, the end portion 42 may be folded in an opposite direction, as shown in phantom indicated by 42' wherein the end portion 42' is in overlapping relation to the front face 12. The upper portion 17 is then folded or positioned over the rolled portion 40 to the same position as shown in FIG. 14. Alternatively, the end portion 42' could be folded into overlapping relation with the upper portion 17 after the upper portion 17 has been folded over the rolled portion 40.

Referring to FIG. 15, the present fold technique for the air bag 10 is particularly adapted to be used in an instrument panel mounted supplemental inflatable restraint module 28 which is deployed through a rearward face 45 of the vehicle instrument panel 30 wherein the module 28 is angled downwardly from the inflator 24 to a door 44 of the inflatable restraint module 28. During deployment, the upper portion 17 of the air bag 10 will initially push the door 44 open about a hinge area located at an upper portion of the door 44, and the rolled portion 40 will subsequently inflate and roll outwardly along the lap of a passenger 46. Thus, the present fold technique for the air bag 10 ensures that the air bag is properly deployed from the module 28 and further ensures that the bag deploys along the lap of the passenger 46 and toward the passenger's torso, even when the inflatable restraint module 28 is oriented such that it directs the deployment of air bag 10 downwardly.

While the method herein described constitutes a preferred embodiment of the invention, it is to be understood that this method is not limited to this precise method, and changes may be made therein without departing from the scope of the invention, which is defined in the appended claims. For example, the air bag 10 could be folded or rolled to have fewer or more folds than those described above, and the various steps may be performed in a different sequence.

The embodiments of the invention in which an exclusive property or privilege is claimed is defined as:

1. A method of folding an air bag for a vehicle supplemental inflatable restraint system comprising the steps of:

(a) providing the air bag in a flattened positional, said air bag in said flattened position having a front face and a rear face located in facing relationship to each other, said air bag further having upper and lower edges defined at junctions between said front face and said rear face and an inflation opening located in said front face between said upper and lower edges wherein an upper portion is defined between said upper edge and said inflation opening and a lower air bag portion is defined between said lower edge and said inflation opening;

(b) successively folding said entire lower portion of said air bag upwardly along said rear face to form a series of unidirectional folds in said entire lower portion, beginning at said lower edge and ending at said inflation opening, to form an entirely unidirectionally rolled portion of said air bag located over said inflation opening; and (c) folding said upper portion over said rolled portion.

2. The method as recited in claim 1 wherein step (c) further comprises the step of folding an end of said upper portion in overlapping relation to an adjacent area of said upper portion to define an overlapped portion.

3. The method as recited in claim 2 wherein said overlapped portion is folded over said rolled portion.

4. The method as recited in claim 3 wherein said overlapped portion is folded over said rolled portion in the same direction as said end of said upper portion is folded over said adjacent area.

5. The method as recited in claim 3 wherein said overlapped portion is folded over said rolled portion in a direction opposite from the direction said end of said upper portion is folded over said adjacent area.

6. The method as recited in claim 1 wherein said air bag includes opposing lateral sides extending between said upper and lower edges and step (a) further includes the step of folding said lateral sides inwardly toward said inflation opening.

7. The method as recited in claim 6 wherein said step of folding said lateral sides includes forming accordion folds in each of said lateral sides.

8. A method of folding an air bag for a vehicle supplemental inflatable restraint system comprising the steps of:

(a) providing the air bag in a flattened position, said air bag in said flattened position including a front face, a rear face in facing relationship to said front face, upper and lower edges defined at junctions between said front face and said rear face, an inflation opening located on said front face between said upper and lower edges, and an upper portion defined between said upper edge and said inflation opening and a lower portion defined between said lower edge and said inflation opening;

(b) successively folding said entire lower portion of said air bag upwardly onto said rear face, beginning at said lower edge and ending at said inflation opening, to form a series of unidirectional folds in said entire lower portion defining an entirely unidirectionally rolled portion of said air bag located over said inflation opening; and (c) folding said upper portion over said rolled portion.

9. The method as recited in claim 8 wherein step (c) further comprises folding an end of said upper portion into overlapping relation to an adjacent area of said upper portion.

10. The method as recited in claim 8 wherein said air bag includes opposing lateral sides extending between said upper and lower edges and accordion folds are formed in said lateral sides prior to step (b).

11. An air bag for a vehicle supplemental inflatable restraint system, said air bag comprising:

a front face and a rear face in facing relationship to said front face such that said front face and said rear face entirely abut each other in a flattened position;

said front face comprising an inflation opening located in said front face for permitting passage of a gas into said bag;

an upper edge defined at an upper junction between said front face and said rear face what said faces are in the flattened position and a lower edge defined at a lower junction between said front face and said rear face when said faces are in the flattened position wherein an upper portion is defined between said upper edge and said inflation opening and a lower portion is defined between said lower edge and said inflation opening;

a series of unidirection folds extending over said rear face and formed in said entire lower portion, beginning at said lower edge and ending at said inflation opening, to define an entirely unidirectionally rolled portion located on top of said rear face over said inflation opening; and wherein said upper portion at least partially extends over said rolled portion.

12. The air bag as recited in claim 11 wherein said air bag includes opposing lateral sides extending between said upper and lower edges, and accordion folds formed in each of said lateral sides.

* * * * *